O. A. ROSS.
VARIABLE SPEED TRANSMISSION.
APPLICATION FILED NOV. 8, 1916.

1,373,099.

Patented Mar. 29, 1921.

INVENTOR:
Oscar A. Ross.

UNITED STATES PATENT OFFICE.

OSCAR A. ROSS, OF BROOKLYN, NEW YORK.

VARIABLE-SPEED TRANSMISSION.

1,373,099.  Specification of Letters Patent.  Patented Mar. 29, 1921.

Application filed November 8, 1916. Serial No. 130,255.

*To all whom it may concern:*

Be it known that I, OSCAR A. Ross, a citizen of the United States of America, State of New York, and county of Kings, residing at 55 Hanson Place, city of Brooklyn, have invented a new and useful Improvement in Variable-Speed Transmission, of which the following is a specification.

My invention belongs to that class of vehicles or automobiles which are self-propelled and which employ a variable speed transmission between the engine and wheels for propelling the vehicle.

As is well known, when a driver, or chauffeur starts his automobile, it is necessary for him to manually make several gear shifts. These gear shifts must be made at a time his automobile is traveling at a certain speed whether he be accelerating or de-celerating in speed, otherwise severe clashing of gears will result, causing undue wear and danger of breakage. Further, due to manual shifting of gears, attention and physical effort is required which detract from observing condition of the roadway so essential to proper and safe driving of automobiles. Also operators learning to drive automobiles, through inexperience and great number of operations required in starting an automobile, often have serious accidents owing to looking down at "shift lever" when their attention should be directed to conditions in front of the car they are operating. Also inexperienced operators will attempt to change gears without dis-engaging the clutch which is ruinous to gears.

One of the objects of my invention is to produce a self-propelled vehicle or automobile in which, for a given speed of the vehicle, the proper speed ratio between the motive power which drives the vehicle and wheels which propel the vehicle is automatically obtained by momentarily disconnecting said motive power from propelling the vehicle.

Another object is to prevent any attempt at shifting gears unless the motive power has been entirely disconnected from propelling the vehicle thereby avoiding stripped or broken gears.

Another object is to simultaneously start a hydro-carbon motor by a self-starting device therefor, start ignition for said motor, automatically shift into place the proper gears in transmission box for speed at which vehicle is traveling, this of course being low speed if vehicle is at rest, and lastly after hydro-carbon motor has started, to automatically cut out said self starting device and convert it into an energy producing unit.

Another object is to produce means whereby, should a gear fail to properly mesh or enter into proper engagement with another gear as intended, it will do so immediately upon attempt to cause gears to rotate as for instance by dropping in the clutch a well known term and factor in self-propelled vehicles.

Referring to the accompanying drawing in which like or similar reference characters indicate like or corresponding parts. Figure 1 is a diagrammatic arrangement of the principal elements used to develop motive power and propel a self-propelled vehicle.

Figure 1:
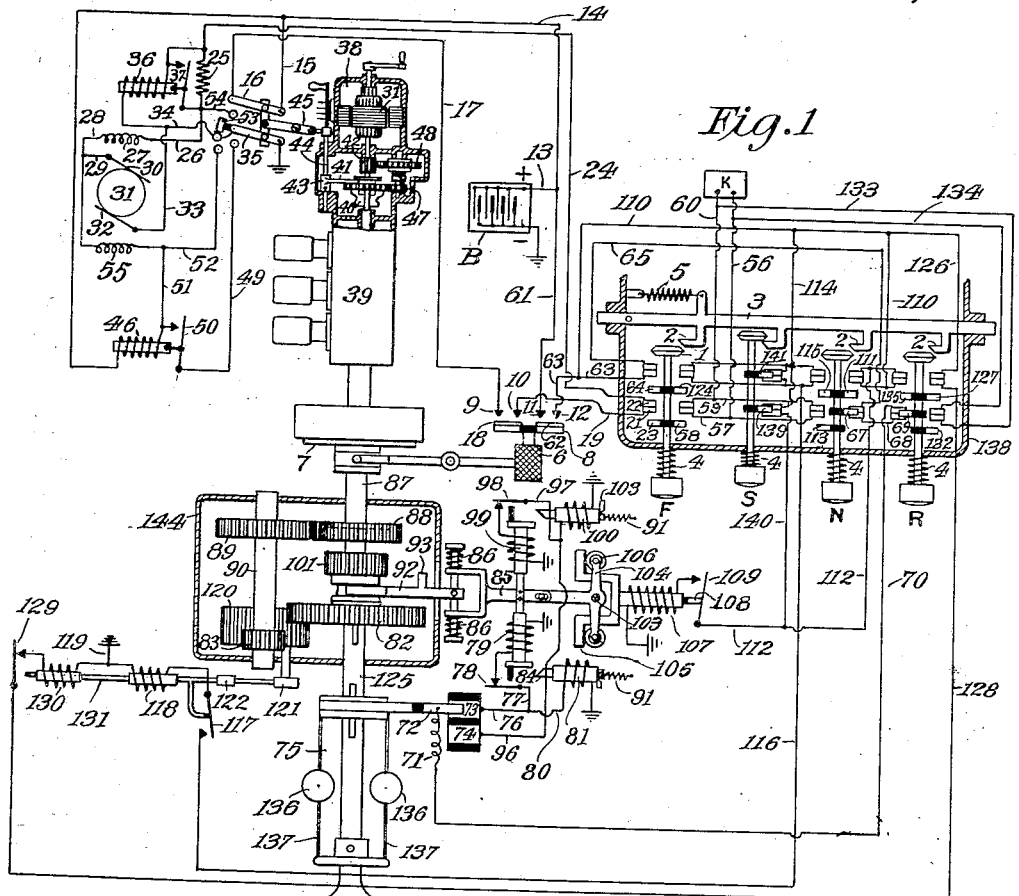
Figure 2:
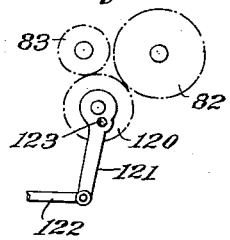
Fig. 2, is a plan view showing the pitch lines of gears, and lever involved in obtaining reverse movement of the vehicle.

Referring to Fig. 1, all parts are shown at rest. It will be noted that the stop control button S, is latched down. Hydro-carbon motor 39 is of the well known multi-cylinder type and is preferably started by self-starting unit 38 which is incorporated in the housing of motor 39. To distinguish from self-starting motor 38, the motor 39 will hereinafter be termed an engine. Engine 39 through clutch 7 transmits power to gear box, or transmission 144 and from thence to shaft 125, universal joint 145 and shaft 102 to rear axle 142. Rear axle 142 is of well known construction termed "bevel gear type" and has wheels 143—143 which propel the vehicle. Governor 75 is of the centrifugal type and revolves with shaft 125. Its speed therefore is practically in proportion with the speed of the vehicle. Control panel 138 is preferably located on the steering column of the vehicle, or otherwise convenient to the operator. Battery B, is a storage battery of standard construction and supplies energy to the various circuits required on the vehicle. Device K, supplies ignition to engine 39 and may be a magneto, battery, induction coil, or like apparatus.

Assume now it is required to operate the vehicle forward: Control button F is depressed and latched up thereby releasing stop button S or any other button which may have been latched down. As forward control button is depressed the bevel face 1 engages latch 2 thereby forcing the bar 3 to the right. The moment the point 2 of the latch on stop control button has moved sufficiently to the right to reach bevel 1 on the stop rod the stop control button will move outward under pressure of spring 4 which is sufficient to overcome spring 5. Simultaneously with depressing forward control button F, the operator also places his foot on pedal 6 thereby disengaging clutch 7 in a well known manner. This operation also moves contact piece 8 attached to pedal 6 but insulated therefrom, to close circuits through contact points 9, 10, and 11, 12.

The combined action of latching down the forward control button F and disengaging clutch 7 establishes the following circuits:

Self-starting circuit.

From battery B to wires 13, 14 and 15, switch lever 16, wire 17, contact 9, contact piece 18, contact 10, wire 19, contacts 21, and 22 bridged by contact piece 23, wire 24, resistance 25, wire 26, series field 27, wires 28, 29 to brush 30, armature 31 to brush 32, wires 33 and 34 to switch arm 35 and thence to negative side of battery B by a path through ground on the vehicle. Part of current through wire 24 is shunted to slow-acting relay 36, which after a short interval shunts out resistance 25 by means of its contact lever 37, thereby imposing full voltage of battery B across the terminals of motor 38. The object of resistance 25 is to prevent a short circuit of battery B by permitting motor 38 to accelerate before full voltage is applied to its terminals.

After engine 39 has started under its own fuel and ignition, its speed becomes great enough to cause counter-weights 40—40 to move outward and cause gear 41 to internally mesh with gear 42 thereby driving armature 31 of motor 38 direct. Movement of gear 41 also operates fork 43 and rod 44 causing lever 45 to move switch levers 16 and 35 to their lower position. This operation converts motor 38 into a generator and as it is rotated by engine 39, it supplies current to battery B through the "voltage relay" 46. Gears 47 and 48 are used to obtain a low gear reduction between motor 38 and engine 39 at the time when motor 38 is starting the engine. Centrifugal weights 40—40 are so adjusted, that on increase of speed, gear 41 remains in mesh with gear 47 until the speed of engine 39 is in excess of such speed as motor 38 is capable of developing in engine 39. In other words motor 38 can never operate at a sufficiently high speed to cause weights 40 to effect movement of gear 41. Weights 40 are also so adjusted that on reduction of speed gear 41 remains in internal mesh with gear 42 until engine has reduced its speed to nearly zero. In other words just before engine 39 stops the weights 40 operate to shift gear 41 into mesh with gear 47 thereby placing motor 38 in a position to again start engine 39 when so required.

With engine 39 operating under its own fuel and driving motor 38, and assuming speed is high enough to generate a voltage that will pick up relay 46, the following circuit is established to charge battery B.

Battery charging circuit.

From ground to switch lever 35 in its lowered position, wire 49, contact lever 50 of voltage relay 46, wires 51 and 52, contact piece 53, wires 34 and 33, to brush 32, armature 31, brush 30, wires 29 and 28, series field 27, wires 26 and 54, to switch lever 16 in its lowered position and wires 15 and 14 to positive side of battery. It is to be noted that armature 31 has shunt field 55 connected across its terminals, also that series field 27 is in series with armature 31. However the current which now flows through series field 27 tends to set up a magnetic flux which is in opposition to the flux set up by the shunt field. Therefore if speed of armature 31 becomes excessive and tends to build up an abnormal voltage the increased current tending to flow through the battery charging circuit will be choked down to practically normal by the opposing series field in the manner described.

Gear 47 drives gear 48 through a friction medium thus preventing stripping of gear teeth on "kick back" of engine 39 as it starts on its own fuel.

Simultaneously with establishing the self-starting circuit as control button F is depressed the following additional circuit is established:

Ignition circuit.

From ignition device K to wire 56, wire 57, contact piece 58 on forward control button when depressed, wires 59 and 60 back to device K. This circuit serves to supply ignition to engine 39 in a manner well known to those versed in the art.

Also simultaneously with establishing the two foregoing circuits the following third circuit is established:

Automatic gear shifting circuit for low gear.

From positive side of battery B, wires 13 and 61, contact point 11, contact piece 12, wire 63, contact piece 64 on forward control button when said button is depressed, wire 65, contact piece 67 on "neutral control 'N'" button in its unlatched position, wire 68, contact piece 69, on "reverse control button" R in its unlatched position, wires 70 and 71, movable contact piece 72 operated by centrifugal governor 75, assuming the vehicle to be at rest, contact 73, wires 76 and 77, contact lever 78, low gear shift magnet 79, to ground returning to battery B. The object of this circuit when established is to energize magnet 79 which through operation of its core causes gear 82 to shift into engagement with gear 83. The vehicle is now in low gear and power from engine 39 is transmitted as follows: shaft 87, gear 88, gear 89, shaft 90, gear 83, gear 82 to shaft 125 and thence to rear axle 142. In other words for a given speed of engine 39 the slowest speed of wheels 143 will be obtained.

In multiple with low gear shift magnet 79 is latch magnet 81, therefore simultaneous with energizing magnet 79 the latch magnet is energized by the following circuit: from wire 76 to wire 80, magnet 81, returning to battery via ground. The object of the latch magnet is as follows: Assume magnet 79 to be energized as above described. It will complete its stroke and become latched under dog 84 as magnet 81 is likewise energized and moves dog 84 into the path of the enlarged head of core in magnet 79. Should gears 82 and 83 fail to engage properly, magnet 79 will move bar 85 to its extreme limit in that direction, thereby compressing spring 86. As soon as clutch 7 engages with engine 39, rotation of shaft 87 causes gears 88 and 89 to revolve gear 83 through shaft 90 thereby causing instant engagement with gear 82 owing to compressed condition of spring 86. As soon as clutch 7 engages with engine 39 by releasing foot pressure on pedal 6 the latching circuit for magnet 79 is interrupted. However, owing to the excessive pressure of spring 86, when compressed, the pressure of enlarged head on core of magnet 79 against latch 84 is sufficient to hold latch under said head and against the tension of spring 91. The moment however that gear 82 assumes its proper location, pressure on latch 84 ceases and it returns to its normal position as shown.

As magnet 79 completes its stroke it also operates contact lever 78 thereby opening its own circuit. The reason for this is to economize in energy as the gear shifting magnets require a large amount of power to properly shift any one of the gears and also meet any emergency by failure of the gears to mesh, or engage as heretofore explained. The general failure of gears to properly engage with each other is due to the teeth of each gear being directly opposite each other in place of having a tooth opposite a space of the adjacent gear. Failures of this kind are not frequent but must be provided for.

Figure 3:
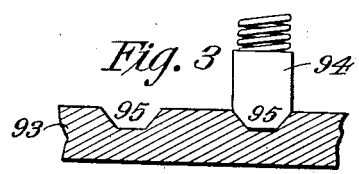
Fig. 3, is an enlarged view of the centering and locking device which maintains gears in place after automatic shifting has taken place.

Shifting fork 92 is provided with an extension 93 shown broken off and of which Fig. 3 is an enlarged view. As gear 82 is shifted in either direction dog 94 is raised from one notch 95 to the other, dependent upon whether it be in low, high or neutral gear. This is a procedure and construction well known to those skilled in the art. When gear 82 has completed its movement dog 94 determines its location and centers the gear properly so that all pressure is relieved on dog 84 and it can restore to its normal position.

Assume now that the operator of the vehicle has accelerated engine 39 to a point where vehicle is traveling at a speed demanding high gear, that is a lower gear ratio between the engine 39 and propelling wheels 143, to permit a higher speed of vehicle. Governor 75 is now operating at a speed to cause contact finger 72 to contact with contact piece 74, which is connected to the high gear shift magnet. Indication of this condition could be carried forward to the operator for his information but is not shown in the accompanying drawing. However the operator feeling the necessity for a gear change depresses pedal 6 and with conditions existing as above described the following circuit is established:

*Automatic gear shifting circuit for high gear.*

This circuit is identical to the automatic gear shifting circuit for low gear up to and including contact finger 72 thence the circuit is to contact 74, wires 96 and 97, contact lever 98, high gear shift magnet 99, returning to battery B, via ground. Similar to the latch magnet 81, latch magnet 100 is supplied to coöperate with gear shift magnet 99, both of which perform relative functions to magnets 79 and 81.

As high gear shift magnet 99 is energized, as above described, gear 101 engages internally with gear 88 and engine 39 drives the propeller shaft 102 direct in a manner well known.

Stop 103 controls the backward limit, of movement, of cores in magnets 81 and 100.

Finger 72 is arranged in a manner to avoid contacting with contacts 73 and 74 at the same time.

Whenever magnets 79 or 99 are energized as heretofore described, the T shaped crank 104 will be rotated on its pivot 103 thereby forcing member 105 to the left through rollers 106. To member 105 is secured core of neutral magnet 107 carrying insulated portion 108. As member 105 is moved to the left, contact lever 109 closes a partial circuit to neutral magnet 107. To complete this circuit it is necessary to depress the pedal 6 in combination with having neutral control button N, depressed and latched down.

Assume now that the operator wishes to bring his vehicle to rest at the same time allowing engine 39 to keep on running. It is of course necessary for him to first disconnect clutch 7 to permit vehicle to decelerate in speed. As vehicle comes to rest the operator also depresses neutral button N, until it is latched up and thereupon the following circuit is established:

*Automatic neutral gear shift circuit.*

Starting from positive side of battery B, wires 13 and 61, through contacts 11, 62 and 12, wires 63 and 110, contact piece 111 with neutral control button latched under projection 2, wire 112, contact lever 109, neutral magnet 107, returning to battery B via ground. As magnet 107 is energized its core operating through member 105 causes rotation of T shaped member 104 to the position shown in the accompanying drawing, see Fig. 1. This procedure places gear 82 in a position where it will not be rotated by either gear 83 or gear 88, and is termed neutral position. It will be noted that as neutral control button is latched down, it maintains the circuit to ignition device K after it has been broken by forward control button being released, as is the case when neutral button was depressed. The ignition circuit is now closed by contact piece 113 completing the circuit through wires 57 and 59. Therefore engine 39 is permitted to operate under its own fuel.

It will be noted that, like magnets 79 and 99 the magnet 107 through insulated portion 108 operates contact lever 109 at the end of its stroke, thereby opening its own circuit after it has completed its function.

Simultaneous with the establishment of the automatic neutral gear shift circuit, a branch circuit to reverse dis-engaging magnet 118 is established as follows: from wire 110, to wire 114, contact piece 115, wire 116, contact lever 117, dis-engaging reverse magnet 118, wire 119, returning to battery B via ground. This branch of the automatic neutral gear shift circuit is for the purpose of disengaging the reverse gear 120, assuming said gear had been in use for propelling the vehicle backward as is often required. It is accomplished as follows: As magnet 118 is energized its core moves to the right thereby operating link 122 which causes lever 121 to pivot on pin 123 thereby moving gear 120 out of engagement with gear 82.

It will be noted that like magnets 79 and 99 the magnets 118 and 130 open their own circuit at the end of the movement of their cores, and for the same purpose.

It will be noted that a branch circuit from wires 114 and 116 lead to contacts on the forward control button F, and that circuit to magnet 118 is also closed through contact piece 124 on arm of forward control button, when said button is latched down. The object of this branch circuit is to insure that reverse gear 120 is out of engagement with gear 82 before any forward gear shifts are made by depressing forward control button F.

It will be seen from the above reference to the automatic neutral gear shift circuit, that latching down neutral button N, in combination with depressing pedal 6 accomplishes the following four functions:

1st. Ignition circuit is maintained, thus permitting engine 39 to run.

2nd. Assumed to have been used, the reverse disengaging magnet 118, is energized thereby disengaging gear 120 from gear 82.

3rd. Assumed to have been used, forward speed gears are brought to a neutral position by energizing magnet 107.

4th. Energy is cut off from forward gear shift magnets 79 and 99 also their latch magnets 81 and 100.

With the above four functions performed, pressure on pedal 6 can be released and clutch 7 allowed to engage with engine 39. This will merely rotate idly shaft 87, gears 88 and 89, shaft 90 and gears 83 and 120 without imparting motion to the vehicle.

Assume now that it is desired to reverse the movement of the vehicle. The operator depresses the reverse control button R, at the same time thereby releasing the neutral button or other button which may have been depressed, and at the same time depresses pedal 6. By this sequence of movements the following circuit is established:

*Automatic gear shift circuit for reverse gear.*

From positive side of battery B, wires 13 and 61, contacts 11, 62 and 12 with pedal 6 depressed, wires 63, 110 and 126, contact piece 127 with reverse button R depressed, wire 128, contact lever 129, reverse gear engaging magnet 130, returning to battery B via ground. As magnet 130 is energized its core moves to the left and through connection 131 also moves core of magnet 118 and link 122 to the left. This action causes lever 121 to rotate on center 123 thereby engaging gear 120 with gear 82. The sequence of motion to gears will be as follows: from driving gear 88 to gear 89, shaft 90, gear 83 to gear 120, thence to gear 82 and to shaft 125. It will therefore be seen that shafts 87 and 125 are rotating in opposite directions from each other, thereby causing reverse movement of the vehicle when clutch 7 engages with engine 39. Rotation of engine 39 is as is well known unidirectional. Magnet 130 like the other gear shift magnets opens its own circuit during the latter portion of its stroke.

Simultaneously with establishing above circuit the maintenance of ignition circuit is transferred to contact piece 132 which completes the circuit through wires 133 and 130

134 to ignition device K. Also a circuit to the neutral magnet 107 is established as follows: from positive side of battery B, wires 13 and 61, contacts 11, 62 and 12 with pedal 6 depressed, wires 63, and 110, contact piece 135 with reverse control button R latched down, wire 112, contact lever 109, neutral magnet 107 returning to battery B via ground. As magnet 107 is energized it places gears 82 and 101 in a neutral position as has been heretofore described. Contact piece 135 is preferably arranged so that the last described circuit is established before the automatic gear shift circuit for reverse gear. This places gears 82 and 101 in a neutral position before reverse gear is engaged by operation of magnet 130.

It will also be seen that as reverse control button R is depressed contact piece 69 is moved away from contacts terminating wires 68 and 70 and therefore that both the automatic gear shift circuits for high or low gear are opened in an additional place to that caused by contact piece 64 as forward control button F is unlatched. The object of thus opening the circuit in a second place is to avoid any possible clashing of gears if, for any reason the forward control button should fail to release. Contact piece 67 on the arm of neutral control button serves the same relative purpose as contact piece 69 on reverse arm.

It may be stated briefly that as the reverse control button is latched up the four following functions are performed:

1st. Circuits to forward gear shift magnets 79 or 99 is doubly opened preventing the movement of gears 82 and 101.

2nd. Neutral magnet 107 is energized thereby disengaging any forward speed gear which may be in engagement for driving the vehicle.

3rd. Circuit to ignition device K is maintained thereby permitting engine 39 to operate.

4th. Reverse gear engaging magnet 130 is energized thereby causing engagement of gear 120 with gear 82, therefore direction of vehicle 82 permitting reverse movement of vehicle.

Performance of the above functions are possible only by depressing pedal 6 simultaneous with, or if the operator chooses pedal 6 may be depressed before or after reverse control button R is depressed and latched down.

When it is required to stop the vehicle for any length of time and under which conditions it would be advisable to stop engine 39 the stop control button S is depressed and latched up as shown in Fig. 1, of the accompanying drawing. Latching up stop button releases any other which may have been previously latched up as heretofore described. Also it establishes the following two similar circuits as described under depressing of the neutral button N:

1. From positive side of battery B, wires 13 and 61, contacts 11, 62 and 12 with pedal 6 depressed, wires 63, 110, 114, to contact piece 139, wires 140 and 112, contact lever 109, neutral magnet 107, returning to battery B via ground. The object of this circuit as before described is to shift all forward speed gears to neutral position.

2. From positive side of battery B, wires 13 and 61, contacts 11, 62 and 12 with pedal 6 depressed, wires 63, 110, 114, contact piece 141, wire 116, contact lever 117, reverse disengaging magnet 118, returning to battery B, via ground. The object of this circuit as heretofore described is to disengage the reverse gear, if, for any reason it had been in use to drive the vehicle.

As is well known it is always customary to place all gears in a neutral position when leaving an automobile or like vehicle for any length of time.

It will be noted that all contact pieces as 132 operated by the forward, neutral or reverse control buttons, and which were the means for supplying energy to the ignition device K, are now out of engagement with their contacts. Therefore ignition is cut off from engine 39 and it stops and cannot be started until forward control button F is again depressed and latched down.

Briefly the latching down of stop control button S performs the following functions as pedal 6 is depressed and clutch 7 subsequently disconnected from engine 39:

1st. Ignition circuit is opened thereby stopping engine 39.

2nd. Neutral control magnet 107 is energized thereby shifting forward speed gears to neutral if necessary.

3rd. Reverse disengaging magnet is energized if necessary to disengage the reverse gear, and place it in a neutral position.

From the entire foregoing it will be seen that I have devised a system for the control of self-propelled vehicles in which the operator's attention for changing gears is reduced to a minimum. Further in my improved system gears cannot be shifted without disconnecting the clutch and then only when the speed of vehicle is such that a change of gear ratio is required, all of which avoid undue clashing of gears and destructive wear to the operating parts. Further in my improved system of control, by simply depressing a button in combination with depressing the clutch pedal the engine is self-started, ignition circuit to engine is established, self-starter is automatically cut out and converted into a generator, and lastly proper gears are shifted for speed at which vehicle is traveling, or is to travel as it is accelerated from rest; all the above demanding a minimum amount of attention and permitting a rapid "get away."

It will be evident to those skilled in the art that various modifications may be made in my system without departing from the spirit of the invention, as for example, that the clutch 7, gear box 144, with its gear and gear shift apparatus, as 79 and 99, also governor 75 will be appropriately sealed in a housing preferably made a component part of the rear end of engine case. Also self-starting motor 38 with its apparatus will be suitably housed in a compartment preferably forming a component part of the forward end of engine case.

Having thus described my invention what I claim to be new and desire to secure Letters Patent on is,

1. The combination, in a self propelled vehicle, of a prime mover, a propeller shaft, variable speed gearing connecting the prime mover and the propeller shaft, a clutch connected between the gearing and the prime mover, means for starting the prime mover, automatic means associated with the propeller shaft to effect different relations in the gearing, and means including a device for simultaneously operating the clutch to render effective the starting means and the automatic means.

2. The combination, in a self propelled vehicle, of a prime mover, a propeller shaft, variable speed gearing connecting the prime mover and the propeller shaft, means for starting the prime mover, automatic means associated with the propeller shaft to effect different relations in the gearing, means connecting the prime mover and the gearing, and means to render effective the starting means and the automatic means dependent upon the means connecting the prime mover and the gearing.

3. The combination, in a self propelled vehicle, of a prime mover, a propeller shaft, variable speed gearing connecting the prime mover and the propeller shaft, means for starting the prime mover, automatic means associated with the propeller shaft to effect different relations in the gearing, and means to stop the prime mover and move the gearing to its neutral position whereby no gear connection exists between the prime mover and the propeller shaft, and means to render effective the starting means and the automatic means and the means to stop the prime mover.

4. The combination, in a self propelled vehicle, of a prime mover, a propeller shaft, variable speed gearing connecting the prime mover and the propeller shaft, means for starting the prime mover, means to effect different relations in the gearing, and means to render effective the starting means and the means to effect different relations in the gearing.

5. The combination, in a self propelled vehicle, of a prime mover, means for starting the prime mover, a propeller shaft, variable speed gearing connecting the prime mover and the propeller shaft, means for disconnecting the prime mover from said gearing, means to effect different relations in the gearing, and means to render effective the starting means and the means to effect different relations in the gearing dependent upon the disconnecting means.

6. The combination, in a self propelled vehicle, of a prime mover, a propeller shaft, variable speed gearing connecting the prime mover and the propeller shaft, means for starting the prime mover, automatic means associated with the propeller shaft to effect different relations in the gearing, a source of stored energy to operate said automatic means adapted to receive its energy from said starting means, and means to render effective the starting means, the automatic means and the source of stored energy.

7. The combination, in a self propelled vehicle, of a prime mover, a propeller shaft, variable speed gearing connecting the prime mover and the propeller shaft, means for starting the prime mover, means to effect different relations in the gearing, a source of energy for said starting means and means to effect different relations in the gearing, said source being dependent for its energy upon said starting means, and means to render effective the starting means and the means to effect different relations in the gearing.

8. In a self propelled vehicle, in combination: a prime mover; means for starting the prime mover; a drive shaft; a propeller shaft; gearing for connecting the drive shaft and the propeller shaft; electro-magnetic means for causing the gearing to connect the drive shaft and the propeller shaft; means for connecting and disconnecting the prime mover with the drive shaft; means for operating said last named means; a source of current; partial circuits connecting the source of current, the means for starting the prime mover and the electro-magnetic means; a forward button; a neutral button and a reverse button; a circuit controller connected to and operated by the operation and position of said buttons; means for holding each button in operated position and for causing all buttons to return to normal position except the one being operated; circuit controllers governed by the means for operating the means for connecting and disconnecting the prime mover with the drive shaft, said circuit controllers being closed when the prime mover is disconnected from the drive shaft and open when the prime mover is connected with the drive shaft, said last mentioned circuit controllers and the circuit controllers operated by the buttons serving to close the said partial circuits when the forward button is operated and the neutral and reverse buttons are in unoperated position.

9. In a self propelled vehicle, in combination: a prime mover; a propeller shaft; a drive shaft; means for starting the prime mover; a high ratio gearing and a slow ratio gearing; a device responsive to the speed of the vehicle; electro-magnetic means for connecting the drive shaft and the propeller shaft by either the high or the low ratio gearing dependent upon the speed responsive device; a forward circuit controller button, a neutral circuit controller button and a reverse circuit controller button, each of said buttons associated with and operating circuit controllers; means for connecting and disconnecting the prime mover with the drive shaft; circuit controllers governed by said last named means; and means controlled by the last named circuit controllers and the circuit controllers associated with the buttons for starting the prime mover and energizing the electro-magnetic means.

10. In a self propelled vehicle, in combination: a prime mover; means to start the prime mover; a drive shaft; a propeller shaft; means including a clutch pedal for connecting the prime mover and the drive shaft; variable speed and reverse gearing connecting the drive shaft and the propeller shaft; means including the clutch pedal and a series of singly manually operable circuit controlling devices for either starting the prime mover and vehicle; stopping the prime mover and vehicle disengaging the gearing or making operative the reverse gearing by the manual operation of a single circuit controlling device and the clutch pedal.

11. In a self propelled vehicle, in combination: a prime mover; a propeller shaft; variable speed and reverse gearing connecting the prime mover and the propeller shaft; means for starting the prime mover; automatic means associated with the propelled shaft to effect different relations in the gearing; means to render effective the starting means and the automatic means and means coöperating with the last mentioned means to render the reverse gearing effective.

In testimony whereof OSCAR A. ROSS has signed his name to this specification in the presence of two subscribing witnesses, this 6th day of November, 1916.

OSCAR A. ROSS.

Witnesses:
FREDERICK C. WALTER,
JOB J. BULLERD.